(12) United States Patent
Lueghamer

(10) Patent No.: US 9,915,382 B1
(45) Date of Patent: Mar. 13, 2018

(54) PIPE FOR SLURRY TRANSPORT

(71) Applicant: AGRU/AMERICA, Inc., Georgetown, SC (US)

(72) Inventor: Albert Lueghamer, Bad Hall (AT)

(73) Assignee: ARGU/AMERICA, INC., Georgetown, SC (US)

( * ) Notice: Subject to any disclaimer, the term of this patent is extended or adjusted under 35 U.S.C. 154(b) by 146 days.

(21) Appl. No.: 14/714,810

(22) Filed: May 18, 2015

Related U.S. Application Data

(60) Provisional application No. 61/994,400, filed on May 16, 2014.

(51) Int. Cl.
| F16L 9/14 | (2006.01) |
| B29C 47/06 | (2006.01) |
| B29C 47/00 | (2006.01) |
| B29K 21/00 | (2006.01) |
| B29K 101/12 | (2006.01) |

(52) U.S. Cl.
CPC ............ *F16L 9/14* (2013.01); *B29C 47/0023* (2013.01); *B29C 47/065* (2013.01); *B29K 2021/003* (2013.01); *B29K 2101/12* (2013.01); *B29K 2995/007* (2013.01)

(58) Field of Classification Search
USPC ................. 138/137, 141, 146, 36; 428/36.91
See application file for complete search history.

(56) References Cited

U.S. PATENT DOCUMENTS

| 1,518,705 | A | * | 12/1924 | Raun | ........................ | F16L 57/00 |
| | | | | | | 138/173 |
| 1,816,076 | A | * | 7/1931 | Down | ..................... | F16D 51/08 |
| | | | | | | 138/123 |
| 4,437,679 | A | * | 3/1984 | Campagnolo | .......... | B62K 19/02 |
| | | | | | | 138/141 |
| 5,573,039 | A | * | 11/1996 | Mang | ...................... | F16L 11/12 |
| | | | | | | 138/137 |
| 6,203,873 | B1 | * | 3/2001 | Shifman | ................... | B32B 1/08 |
| | | | | | | 428/212 |
| 6,213,155 | B1 | * | 4/2001 | Furuta | ..................... | F16L 11/02 |
| | | | | | | 138/123 |
| 6,686,012 | B1 | * | 2/2004 | Molnar | ................... | B32B 27/08 |
| | | | | | | 428/36.91 |
| 2004/0142135 | A1 | * | 7/2004 | Verschuere | ............... | B32B 1/08 |
| | | | | | | 428/36.91 |
| 2015/0345670 | A1 | * | 12/2015 | Proof | ........................ | B32B 1/08 |
| | | | | | | 138/137 |

* cited by examiner

*Primary Examiner* — James Hook
(74) *Attorney, Agent, or Firm* — Gerald E. Hespos; Michael J. Porcp; Matthew T. Hespos

(57) ABSTRACT

The invention relates to a pipe that has a plurality of layers including a main pipe body with opposite inner and outer circumferential surfaces. The pipe further includes an inner layer with an outer circumferential surface that is in integral face-to-face contact with the inner circumferential surface of the main pipe body. The inner layer is formed from a synthetic resin that is more abrasion resistant than the main pipe body.

15 Claims, 2 Drawing Sheets

PIPE FOR SLURRY TRANSPORT

CROSS-REFERENCE TO RELATED APPLICATIONS

This disclosure claims the benefit of priority to U.S. Provisional Application No. 61/994,400, filed May 16, 2014, the disclosure of which is incorporated herein in its entirety.

FIELD OF THE INVENTION

The invention relates a pipe for transporting a slurry comprised of a fluid and solids entrained in the fluid.

BACKGROUND

A slurry comprises a fluid and solids, such as particulates, entrained the fluid. Slurries often are a byproduct of manufacturing, construction or excavation, and the solids in the slurry can be separated from the fluid so that both the solids and the fluid can be processed separately. In some instances, the fluid and the solids entrained therein both are waste products of a primary manufacturing, construction or excavation project. Separation of the solids from the fluid in the slurry enables the components of the slurry to be processed and/or disposed of in environmentally appropriate manners. In other situations, the slurry is created to transport economically valuable solids from one point to another. In this regard, slurries can provide a cost-effective method of transportation in the mining industry. More particularly, slurries often are created in the mining industry to transport a mixture of water and ore to a location where the ore can be separated and processed.

Any piping system theoretically can be used to transport a slurry. For example, clay pipes, cement pipes and steel pipes often are used for slurry transport. However, the solids in the slurry cause considerable abrasion and can lead to failure of the pipe due to abrasion. A failure of a pipe that carries a slurry can result in very significant economic and environmental costs. The structural integrity of a pipe can be monitored so that repairs or replacements can be completed well before a pipe failure. However, the repair or replacement of an abraded pipe requires the slurry transport to be terminated while the repair or replacement is being carried out. The down time for completing the repair or replacement imposes a significant cost penalty. Conversely, an ability to extend the time between repairs could result in a very significant cost advantage.

The additional pipe abrasion caused by transporting a slurry has other negative implications. For example, the pipe material that is removed by abrasion can contaminate the materials that are being conveyed, and hence can complicate efforts to recover the conveyed solids or to process the conveying liquid. Additionally, the abraded surface of a pipe is not smooth and causes pressure losses. This reduced hydraulic performance caused by an abraded inner surface of a pipe results in increased energy costs for transporting the slurry.

In view of the above, an object of the subject invention is to provide a pipe for transporting a slurry, such as a slurry of a liquid and solids produced in the mining industry.

SUMMARY OF THE INVENTION

The invention relates to a pipe that has a plurality of layers including a main pipe body with opposite inner and outer circumferential surfaces. The pipe further includes an inner layer with an outer circumferential surface that is in integral face-to-face contact with the inner circumferential surface of the main pipe body. The inner layer is formed from a material that is more abrasion resistant than the main pipe body. The main pipe body may be formed from polyethylene. The abrasion resistant inner layer is formed from a synthetic resin that has greater abrasion resistance than the main pipe body.

The main pipe body and the abrasion resistant inner added and integral layer preferably are coextruded so that the outer circumferential surface of the inner abrasion resistant layer is disposed integrally in face-to-face engagement with the inner circumferential surface of the main pipe body.

The pipe may further include an outer layer surrounding the outer circumferential surface of the main pipe body. The outer layer also preferably is coextruded with the main pipe body and the inner layer. The outer layer may be formed from a light color resin for reflecting heat. The light color resin for the outer layer is particularly helpful for those situations where the pipe is used outside and in a situation where the pipe will be exposed to sunlight. More particularly, the light color resin reflects sunlight, and therefore maintains a lower temperature for the pipe with corresponding reduced thermal expansion and contraction. The reduction in temperature-related dimensional changes significant reduces stress on the pipe and further improves the longevity of the pipe. More particularly, spaced apart locations on the pipe often will be fixed to supports. Dimensional changes between those fixed locations can generate significant uncontrolled bending or snaking of the pipe. This bending or snaking is likely to occur in cycles during daytime and nighttime hours. The periodic bending and straightening imposes considerable stress on a pipe and can lead to failure. Reduced temperature achieved by the light color outer layer significantly reduces temperature related bending of the pipe. The reduced temperature of the pipe creates less bending of the pipe because of the reflecting outside layer. Less bending reduces the amount of bends, less bends means also reduced abrasion in the complete piping system. The second effect of the cooler pipe results also a reduced pipe wall temperature and therefore the abrasion of pipe will also be reduced.

The radial dimension of the inner layer preferably is significantly less than the radial dimension of the main pipe body. For example, the inner layer may have a radial thickness of 2-10 mm. The outer layer also preferably is significantly thinner than the main pipe body. The total wall thickness for the pipe preferably is in the range of about 5.8 mm to about 109 mm. The outside diameter of the pipe preferably is in a range of about 63 mm to about 1200 mm.

The synthetic resins of the coextruded pipe preferably are selected to enable lengths of pipes to be welded into end-to-end connection with one another. The welding may be carried out with a heating element to achieve butt welding. Alternatively, electro fusion welding may be employed to connect pipes in end-to-end relationship. Additionally, the synthetic resins of the coextruded pipe preferably are selected to enable the pipe to be bent through an angle of preferably up to approximately 90°. Alternatively, manufactured fittings, such as T-fittings can be used with the pipe. The fittings preferably are manufactured to have an inner layer identical to or similar to the abrasion resistant inner layer of the pipe.

The inner and outer layers of the pipe may be of uniform thickness at all circumferential positions thereon. However, the abrasion is likely to be greater at the gravitational bottom parts of the pipe in view of the tendency of the solids within the slurry to move gravitationally to lower positions in the slurry. Accordingly, the inner layer may be thicker at the bottom of the pipe and may gradually thin toward upper parts of the pipe. With this embodiment, the outer circumferential surface of the pipe preferably includes indicia to identify the top and/or the bottom of the pipe to ensure that the pipe is installed in a proper rotational orientation.

BRIEF DESCRIPTION OF THE DRAWINGS

For a more complete understanding of the disclosure, reference should be made to the following detailed description and accompanying drawing figures wherein.

While specific embodiments are illustrated in the figures, with the understanding that the disclosure is intended to be illustrative, these embodiments are not intended to limit the invention described and illustrated herein.

DETAILED DESCRIPTION

Figure 1:
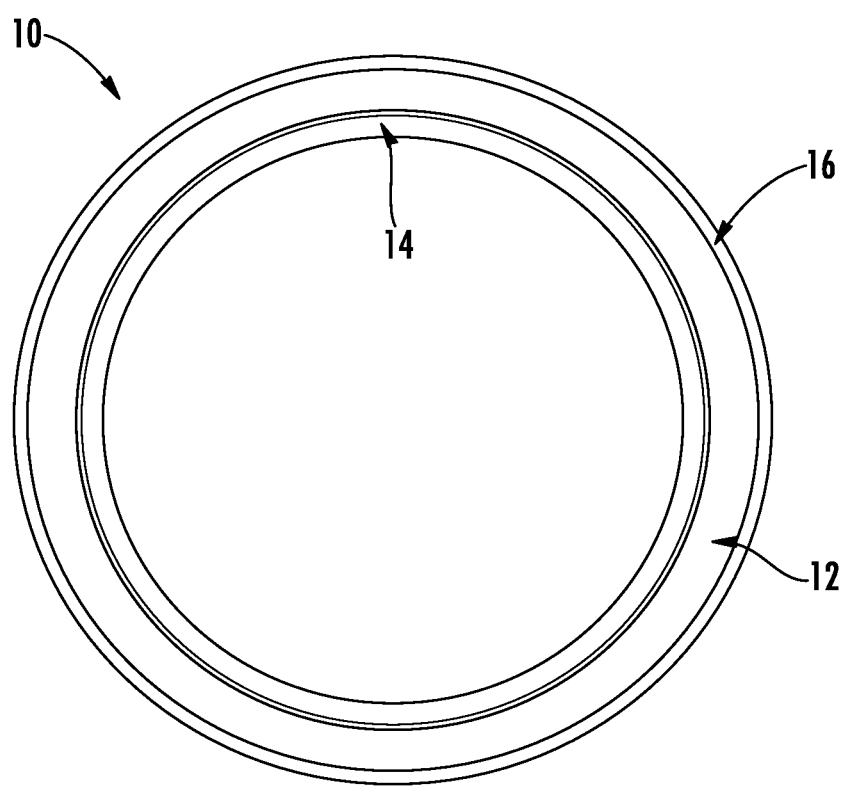
FIG. 1 is an end view of a pipe in accordance with an embodiment of the invention.

A pipe in accordance with the invention is identified generally by the numeral 10 in FIG. 1. The pipe 10 is intended primarily for transporting a slurry that comprises a carrying fluid and solids entrained in and transported by the carrying fluid. Thus, the pipe 10 is particularly well-suited for use in the mining industry and in other industries where solids and/or particulates must be transported between two locations. The dimensions of the pipe 10 can vary in accordance with the demands. For example, outer diameters of the pipe can range from approximately 63 mm to approximately 1200 mm.

The pipe 10 comprises a main body 12 that provides the primary structural support for the pipe. The thickness of the main body 12 can vary in accordance with system requirements and with the outside diameter of the pipe 10. For example, the thickness of the main body 12 may be about 5.8 mm when the outside timbre of the pipe 10 is 63 mm. On the other hand, the thickness of the main body 12 may be approximately 109.1 mm when the outside diameter of the pipe 10 is 1200 mm. Notably, the outside diameter of the pipe 10 can range from about 10 mm to about 2400 mm. wherein the thickness of the main body 12 can range from about 2 mm to about 250 mm. Whereas the thickness of the main body 12 preferably increases with increasing the main body's outside diameter, there is not required ratio of the thickness of the main body to the outside diameter.

The main body 12 can be formed from a polymeric resin. Preferably, the main body resin provides structural support for the pipe and accordingly has a low creep value and low coefficient of linear thermal expansion. More preferably, the main body resin is ridged and resists deformation. The main body resin can be selected from polyethylene, polypropylene, polystyrene, polyvinyl chloride, acrylate, acetal, acrylic, nylon, acrylonitrile butadiene styrene, polycarbonate, and mixtures thereof. The main body can include a single resin in a unibody construction, a single resin in a multilayer construction, a plurality of resins in a unibody admixture, or a plurality of resins in a multilayer construction. Still further, the main body resin can be an composite of a polymer and a filler, where the polymer can be selected from polyethylene, polypropylene, polystyrene, polyvinyl chloride, polyacrylates, acetal, acrylic, nylon, acrylonitrile butadiene styrene, polycarbonate, and mixtures thereof, and the filler can be selected from silicate (e.g., synthetic and natural silicates), alumina (e.g., synthetic and natural aluminas), aluminosilicates (e.g., synthetic aluminosilicates, clays, and minerals), carbon (e.g., graphite) and mixtures thereof. Notably, the filler can be added to change the physical characteristics of the main body, for example, to increase rigidity and/or decrease creep. In one preferable instance, the main body includes or is formed from polyethylene (PE) or a high density polyethylene, such as PE 100, PE 100 RC, PE 4710, or urea resin—plastic powder resin (PPR).

The pipe 10 further comprises an inner layer 14 formed from a synthetic resin that is, preferably, more abrasion resistant than the synthetic resin of the main body 12. The inner layer preferably has an average thickness from 2 mm-10 mm. More particularly, the thickness of the inner layer 14 is preferably about 2 mm when the outside diameter of the pipe 10 is in a range of 63-75 mm. In these situations, the main body 12 preferably can have a thickness of 5.8 mm-6.8 mm. The thickness of the inner layer 14 preferably is about 5 mm when the outside diameter of the pipe 10 is in a range of 180 mm-400 mm. In these situations, the main body 12 preferably has a thickness of 16.4 mm-36.3 mm. A thickness of the inner layer 14 preferably is about 6 mm when the outside diameter of the pipe 10 is in a range of 450 mm-560 mm. In these situations, the main body 12 preferably has a thickness of 40.9 mm-50.8 mm. The inner layer preferably has a thickness of 10 mm when the outside diameter of the pipe 10 is in the range of 1000 mm-1200 mm, and in this range, the main body 12 preferably has a thickness in a range of 90.2 mm-109.1 mm. Of course, these relative dimensions can change depending upon system requirements. The relative dimensions of the pipe 10 enables the pipe 10 to be bent through appropriate angles from 0° to 90°.

As used herein, the term "more abrasion resistant" is understood to mean that in a comparison between two materials the more abrasion resistant material has a lower weight loss pursuant to the Taber Abrasion Test (ASTM D4060), wherein the weight loss is recorded as grams per 1,000 cycles. Preferably, the inner layer resin has a weight loss of less than 0.1 g/1,000 cycles pursuant to the Taber Abrasion Test. Notably, this testing is conducted on test coupons that are composed of the main body resin carrying the inner layer resin. More preferably, the inner layer resin has a weight loss of less than 0.09, 0.08, 0.07, 0.06, 0.05, 0.04, 0.03, or 0.02 g/1,000 cycles.

The inner layer resin preferably has a Shore A Durometer hardness of less than 100. In one instance, the inner layer resin has a hardness in the range of about 20 to about 90, preferably about 30 to about 90, more preferably about 40 to about 90. In another instance, the inner layer resin has a hardness of about 25, 30, 35, 40, 45, 50, 55, 60, 65, 70, 75, 80, 85, or 90. In still another instance, the inner layer resin can have a hardness less than about 90, 85, 80, 75, 70, 65, or 60 and a hardness greater than about 20, 25, 30, 35, 40, 45, 50, 55, or 60.

The inner layer resin can be selected from rubbers, polyurethanes, and/or plastics. In one instance, the inner layer resin can be selected from a chloropolyethylene rubber, a chlorosulfinated polyethylene rubber, an epichlorohydrin rubber, an ethylene acrylic rubber, an ethylene propylene rubber, a fluroroelastomer rubber, a nitrile or acrylonitrile butadiene rubber, an isoprene rubber (e.g., isobutylene, butyl, bromobutyl, of chlorobutyl), a natural polyisoprene rubber, a polychloroprene rubber, a polybutadiene rubber, a styrene butadiene rubber, a synthetic polyisoprene rubber, a polyester polyether urethane rubber, a carboxylated nitrile rubber, and a mixture thereof. The rubber can be a vulcanized rubber and/or can include fillers, plasticizers, antidegradants, and/or non-elastomeric polymers. In another instance, the inner layer can include a plurality of layers composed of rubbers, polyurethanes, and/or plastics. In one example, the inner layer is composed of two or more rubber layers; the rubbers selected from a chloropolyethylene rubber, a chlorosulfinated polyethylene rubber, an epichlorohydrin rubber, an ethylene acrylic rubber, an ethylene propylene rubber, a fluroroelastomer rubber, a nitrile or acrylonitrile butadiene, an isoprene rubber (e.g., isobutylene, butyl, bromobutyl, of chlorobutyl), a natural polyisoprene rubber, a polychloroprene rubber, a polybutadiene rubber, a styrene butadiene rubber, a synthetic polyisoprene rubber, a polyester polyether urethane rubber, a carboxylated nitrile rubber, and a mixture thereof. In another instance, the inner layer can include an elastomeric rubber and a non-elastomeric polymer. The elastomeric rubber selected from a chloropolyethylene rubber, a chlorosulfinated polyethylene rubber, an epichlorohydrin rubber, an ethylene acrylic rubber, an ethylene propylene rubber, a fluroroelastomer rubber, a nitrile or acrylonitrile butadiene rubber, an isoprene rubber (e.g., isobutylene, butyl, bromobutyl, of chlorobutyl), a natural polyisoprene rubber, a polychloroprene rubber, a polybutadiene rubber, a styrene butadiene rubber, a synthetic polyisoprene rubber, a polyester polyether urethane rubber, a carboxylated nitrile rubber, and a mixture thereof. The non-elastomeric polymer selected from a polyethylene, a polypropylene, a polystyrene, a polyvinyl chloride, a polyacrylate, a polyacetal, a nylon, an acrylonitrile butadiene styrene (ABS) polymer, a polycarbonate, and a mixture thereof. In certain circumstances that non-elastomeric polymer can be a high density polyethylene, a medium density polyethylene, a low density polyethylene, a linear low density polyethylene, a polyethylene propylene copolymer, an atactic polypropylene, a syndiotactic polypropylene, a isotactic polypropylene, a polyethylene styrene copolymer, a polypropylene styrene copolymer, a polymethylmethacryalte, and a mixture thereof.

The pipe 10 may further include an outside layer 16 formed from a synthetic resin, preferably, wherein the outside layer is white or a solar reflective color. Preferably, the color of the outside layer 16 reflects heat and enables the pipe 10 to maintain a lower temperature, particularly when the pipe can is exposed to direct sunlight. The lower temperature of the pipe 10 when exposed to direct sunlight results in a much narrower range of temperatures and significantly reduces thermal related expansion and contraction, with correspondingly reduced stresses and strains within the pipe 10.

The outside layer resin is preferably a hard resin, providing an impact resistant and creep resistant shape to the pipe 10. The outside layer resin can be selected from polyurethanes and plastics, for example, polyethylenes, polyfluroroethylenes, polypropylenes, polystyrenes, nylons, acetals, polyetherimides, acrylics, phenolics, and mixtures thereof. Preferably, the outside layer resin has a Rockwell R hardness greater than about 100.

The color of the outside layer resin can be derived from the resin itself or can be provided by the application of a solar reflective paint or coating to the outside layer resin. In one instance, the outside layer resin is colored by the addition of a dye or colorant to the resin. In another instance, the outside layer resin's color is inherent to the resin. In still another instance, the outside layer resin is painted.

In another embodiment, the main body resin and the inner layer resin are coextruded so that the inner circumferential surface of the main body 12 is engaged integrally with, conjoined with, the outer circumferential surface of the inner layer 14. Preferably, the resins to form the main body 12, the inner layer 14, and the outside layer 16 are coextruded so the outer circumferential surface of the main body 12 is engaged integrally with the inner circumferential surface of the outside layer 16. Thus, no on-site assembly is required. In an alternative process, the inner layer 14 can be applied to the inner circumferential surface of the main body 12 by a process that integrally engages the two layers, for example, melt coating, spray coating, or internal blow molding. Preferably, the inner layer and the main body are thermally joined (e.g., thermally welded) during a production step. In an alternative process the inner layer and the main body can be solvent welded and, optionally, later dried or cured.

FIG. 1 shows the pipe 10 having the main body 12, the inner layer 14 and the outside layer 16 with uniform radial thicknesses at all circumferential positions thereon. However, gravity will cause the solids in the slurry to be concentrated more near bottom parts of the pipe 10. As a result, bottom parts of the pipe 10 will be affected more by abrasion than top parts. Accordingly, the coextrusion of the pipe may be carried out so that the inner layer 14 is thicker at the bottom side of the pipe 10 and gradually reduces at locations closer to the top side of the pipe 10. The external surface of the pipe 10 of this embodiment preferably includes at least a temporary marking to distinguish the top from the bottom of the pipe 10. In accordance with this embodiment, a significantly longer pipe life can be provided.

The pipe 10 described and illustrated above was subjected to a Taber Abrasion Test and demonstrated significantly reduced loss of weight due to abrasion when compared to pipes made of PVC, polypropylene or polyethylene.

Figure 2:
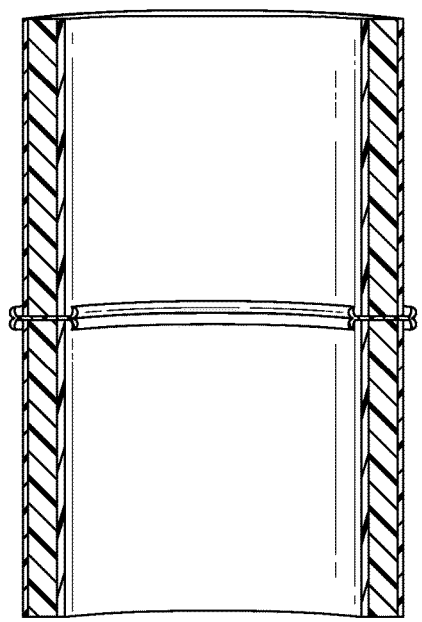
FIG. 2 is a longitudinal cross-sectional view showing a butt welded it connection between two sections of the pipe shown in FIG. 1.
Figure 3:
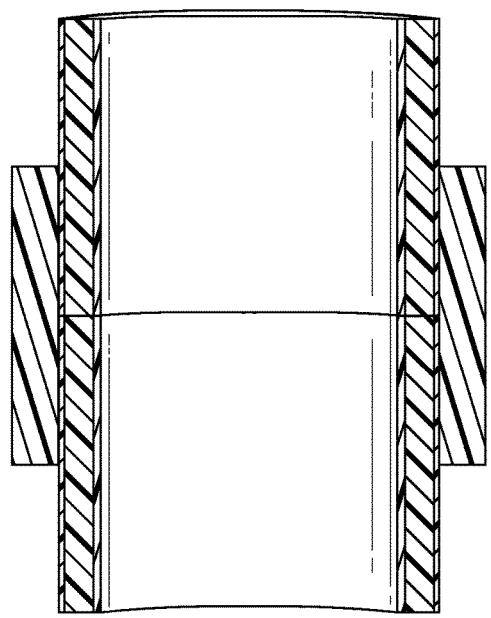
FIG. 3 is a longitudinal cross-sectional view of an electro fusion welded connection between two sections of the pipe shown in FIG. 1.

Segments of the pipe 10 can be welded in end-to-end relationship across the main body 12, the inner layer 14 and the white outside layer 16. In this regard, FIG. 2 shows an example of a butt welding connection achieved by positioning a heating element adjacent the ends of the pipes that are to be welded. FIG. 3 shows a similar connection achieved by electro fusion welding.

What is claimed is:

1. A pipe for carrying a slurry of a fluid and a solid entrained in the fluid, comprising:
   an inner layer conjoined with a main body;
   the main body conjoined with an outside layer;
   wherein the inner layer is more abrasion resistant than the main body;
   wherein the inner layer includes an admixture of an elastomeric rubber and a non-elastomeric polymer;
   wherein the main body includes high density polyethylene.

2. The pipe of claim 1, wherein the inner layer has a Taber Test weight loss of less than 0.1 g/1,000 cycles.

3. The pipe of claim 2, wherein the weight loss is less than about 0.07 g/1,000 cycles.

4. The pipe of claim 1, wherein the inner layer has a Shore A Hardness of about 20 to about 90.

5. The pipe of claim 1, wherein the inner layer includes an elastomeric rubber selected from the group consisting of a chloropolyethylene rubber, a chlorosulfinated polyethylene rubber, an epichlorohydrin rubber, an ethylene acrylic rubber, an ethylene propylene rubber, a fluoroelastomer rubber, a nitrile or acrylonitrile butadiene rubber, an isoprene rubber, a natural polyisoprene rubber, a polychloroprene rubber, a polybutadiene rubber, a styrene butadiene rubber, a synthetic polyisoprene rubber, a polyester polyether urethane rubber, a carboxylated nitrile rubber, and a mixture thereof.

6. The pipe of claim 5, wherein the inner layer has a Shore A Harness of about 30 to about 80 and a Taber Test weight loss of less than 0.5 g/1,000 cycles.

7. The pipe of claim 1, wherein the inner layer includes the admixture of the elastomeric rubber and the non-elastomeric polymer; wherein the non-elastomeric polymer is a linear low density polyethylene.

8. The pipe of claim 1, wherein the main body further includes a resin selected from the group consisting of a polyethylene, a polypropylene, a polystyrene, a polyvinyl chloride, an acrylate, an acetal, an acrylic, a nylon, an acrylonitrile butadiene styrene, a polycarbonate, and a mixture thereof.

9. The pipe of claim 8, wherein the main body consists of a high density polyethylene.

10. The pipe of claim 1 wherein the outside layer is white or a solar reflective color.

11. The pipe of claim 10, wherein the outside layer includes a resin selected from the group consisting of a polyfluroroethylene, a polypropylene, a polystyrene, a nylon, an acetal, a polyetherimide, an acrylics, a phenolic, and a mixture thereof.

12. The pipe of claim 1 further comprising a top side, a bottom side, and an inner layer thickness; wherein the inner layer thickness is greater on the bottom side than on the top side.

13. A pipe for carrying a slurry of a fluid and a solid entrained in the fluid, comprising:

an inner layer composed of an elastomeric rubber and a non-elastomeric polymer, conjoined with a main body composed of high density polyethylene;

the main body conjoined with an outside layer composed of a resin selected from the group consisting of a polyfluroroethylene, a polypropylene, a polystyrene, a nylon, an acetal, a polyetherimide, an acrylics, a phenolic, and a mixture thereof;

wherein the inner layer is more abrasion resistant than the main body;

the pipe further comprising a top side, a bottom side, and an inner layer thickness; wherein the inner layer thickness is greater on the bottom side than on the top side.

14. The pipe of claim 13, wherein the non-elastomeric polymer is a linear low density polyethylene.

15. A process comprising:

transporting in a pipe a slurry of a liquid and a solid produced in the mining industry;

the pipe comprising an inner layer which includes an admixture of an elastomeric rubber and a non-elastomeric polymer, and includes an inner layer thickness that is asymmetric about a longitudinal axis of the pipe;

the inner layer conjoined with a main body that includes high density polyethylene;

the main body conjoined with an outside layer that includes a resin selected from the group consisting of a polyfluroroethylene, a polypropylene, a polystyrene, a nylon, an acetal, a polyetherimide, an acrylics, a phenolic, and a mixture thereof;

wherein the inner layer is more abrasion resistant than the main body; and wherein the outside layer is white or a solar reflective color.

* * * * *